(12) United States Patent
Lin

(10) Patent No.: US 8,618,815 B2
(45) Date of Patent: Dec. 31, 2013

(54) POSITION DETECTING DEVICE

(75) Inventor: Shun-Pin Lin, New Taipei (TW)

(73) Assignees: Sunrex Technology Corp., Taichung (TW); Gimbal Technology Co., Ltd., New Taipei (TW)

( * ) Notice: Subject to any disclaimer, the term of this patent is extended or adjusted under 35 U.S.C. 154(b) by 376 days.

(21) Appl. No.: 13/177,868

(22) Filed: Jul. 7, 2011

(65) Prior Publication Data

US 2012/0187959 A1    Jul. 26, 2012

(30) Foreign Application Priority Data

Jan. 21, 2011    (TW) .............................. 100102308 A

(51) Int. Cl.
*G01R 27/04*    (2006.01)
(52) U.S. Cl.
USPC ...... 324/633; 345/179; 178/18.03; 178/19.01
(58) Field of Classification Search
USPC .......................................................... 324/633
See application file for complete search history.

(56) References Cited

U.S. PATENT DOCUMENTS

| 6,744,426 | B1 | * | 6/2004 | Okamoto et al. | 345/179 |
| 7,176,907 | B2 | | 2/2007 | Chao et al. | |
| 7,474,300 | B2 | * | 1/2009 | Katsurahira et al. | 345/179 |
| 8,154,525 | B2 | * | 4/2012 | Katsurahira | 345/173 |
| 8,183,875 | B2 | * | 5/2012 | Cordeiro et al. | 324/678 |

FOREIGN PATENT DOCUMENTS

TW    I304559    12/2008

* cited by examiner

*Primary Examiner* — Arleen M Vazquez
*Assistant Examiner* — Feba Pothen
(74) *Attorney, Agent, or Firm* — The Webb Law Firm

(57) ABSTRACT

A position detecting device includes: a position indicator operable to resonate at a first frequency, upon receipt of an excitation signal, to oscillate at a second frequency different from the first frequency so as to generate an oscillation signal, and to transmit the oscillation signal thus generated; and a position detector operable to generate the excitation signal and to transmit the excitation signal to the position indicator, and configured to perform band pass filtering and amplitude detection upon the oscillation signal received thereby for generating a processed signal, and to obtain information corresponding to position of the position indicator relative to the position detector based on the processed signal. A frequency range of the band pass filtering includes the second frequency and excludes the first frequency.

9 Claims, 4 Drawing Sheets

POSITION DETECTING DEVICE

CROSS-REFERENCE TO RELATED APPLICATION

This application claims priority of Taiwanese Application No. 100102308, filed on Jan. 21, 2011.

BACKGROUND OF THE INVENTION

1. Field of the Invention

The present invention relates to a detecting device, more particularly to a position detecting device.

2. Description of the Related Art

Referring to FIGS. 1 and 2, U.S. Pat. No. 7,176,907 Taiwanese Patent No. I304559 discloses a conventional passive-type digital tablet pointing system that includes a digital tablet 1 and a wireless pointing device 2 (e.g., a digital stylus).

The wireless pointing device 2 includes a variable inductor 21, two capacitors 22, 23, and a switch 24, which, in combination, correspond to a resonance frequency. The variable inductor 21 has an inductance value that is in a negative relation to a contact pressure between the wireless pointing device 2 and the digital tablet 1. When the wireless pointing device 2 and the digital tablet 1 are in contact with each other, the inductance value of the variable inductor 21 decreases as the contact pressure between the wireless pointing device 2 and the digital tablet 1 increases, which consequently increases the resonance frequency of the wireless pointing device 2. When the switch 24 enters a conductive state, the capacitor 23 will cause the resonance frequency to decrease. The wireless pointing device 2 stores energy upon receipt of an excitation signal having the resonance frequency, and subsequently uses the energy thus stored to generate and transmit an oscillation signal having the resonance frequency.

The digital tablet 1 includes a plurality of first antennas 1/1-1/m arranged along a first direction, and a plurality of second antennas 2/1-2/n arranged along a second direction perpendicular to the first direction. The digital tablet 1 is configured to perform each of a full-region scan and a sub-region scan twice so as to obtain information corresponding to position (i.e., horizontal and vertical coordinate components) of the wireless pointing device 2 relative to the digital tablet 1, and information corresponding to operational states (e.g., the contact pressure between the wireless pointing device 2 and the digital tablet 1, and whether the switch 24 is in the conductive state) of the wireless pointing device 2. The digital tablet 1 detects the operation states of the wireless pointing device 2 based on frequency of the oscillation signals received by the digital tablet 1.

However, the aforesaid conventional passive-type digital tablet pointing system has several drawbacks.

First of all, since the excitation and oscillation signals have the same resonance frequency, the wireless pointing device 2 is unable to receive and transmit signals simultaneously, and hence regular refreshing of the position of the wireless pointing device 2 is relatively time-consuming.

Secondly, the digital tablet 1 must perform a full-region scan and a subsequent sub-region scan for each of the first and second directions so as to obtain the horizontal and vertical coordinate components, which is relatively complex and time-consuming.

Thirdly, like the wireless pointing device 2, the digital tablet 1 is unable to receive and transmit signals simultaneously. Moreover, since the signals transmitted and received by the digital tablet 1 have the same frequency, the digital tablet 1 must perform signal suppression while transmitting each signal so as to avoid receiving its own signal.

Lastly, since the antennas of the digital tablet 1 are substantially non-uniform in terms of distributed capacitance and impedance matching, the excitation signals transmitted by the digital tablet 1 have substantially different oscillation amplitudes. As a result, oscillation signals generated and transmitted by the wireless pointing device 2 upon receipt of the excitation signals have substantially different oscillation amplitudes, such that the digital tablet 1 must perform a relatively complex method of coordinate calculation.

SUMMARY OF THE INVENTION

Therefore, an object of the present invention is to provide a position detecting device capable of alleviating at least one of the aforesaid drawbacks of the prior art.

Accordingly, a position detecting device of the present invention includes a position indicator and a position detector.

The position indicator includes: a first receiver circuit operable to resonate at a first frequency so as to generate a resonance signal upon receipt of an excitation signal; an alternating-current-to-direct-current (AC-DC) converting circuit connected electrically to the first receiver circuit for receiving the resonance signal therefrom, and operable to perform AC-DC conversion upon the resonance signal so as to generate a direct current (DC) power signal; and a first transmitter circuit connected electrically to the AC-DC converting circuit for receiving the DC power signal therefrom, powered by the DC power signal to oscillate at a second frequency different from the first frequency so as to generate an oscillation signal, and operable to transmit the oscillation signal thus generated.

The position detector includes: a plurality of first antennas arranged along a first direction; a plurality of second antennas arranged along a second direction different from the first direction; a second transmitter circuit operable to generate the excitation signal; a second receiver circuit; a switching circuit connected electrically to the first and second antennas, the second transmitter circuit, and the second receiver circuit, and operable, according to a control signal, for switching between a first state, where the first antennas are connected electrically to the second transmitter circuit for transmitting the excitation signal to the first receiver circuit and where at least a portion of the second antennas is connected to the second receiver circuit for enabling the second receiver circuit to receive the oscillation signal from the first transmitter circuit, and a second state where the second antennas are connected electrically to the second transmitter circuit for transmitting the excitation signal to the first receiver circuit and where at least a portion of the first antennas is connected to the second receiver circuit for enabling the second receiver circuit to receive the oscillation signal from the first transmitter circuit; the second receiver circuit being configured to perform band pass filtering and amplitude detection upon the oscillation signal to generate a processed signal, a frequency range of the band pass filtering including the second frequency and excluding the first frequency; and a processing circuit connected electrically to the switching circuit and the second receiver circuit, configured to provide the control signal to the switching circuit, and configured to obtain information corresponding to position of the position indicator relative to the position detector based on the processed signal from the second receiver circuit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
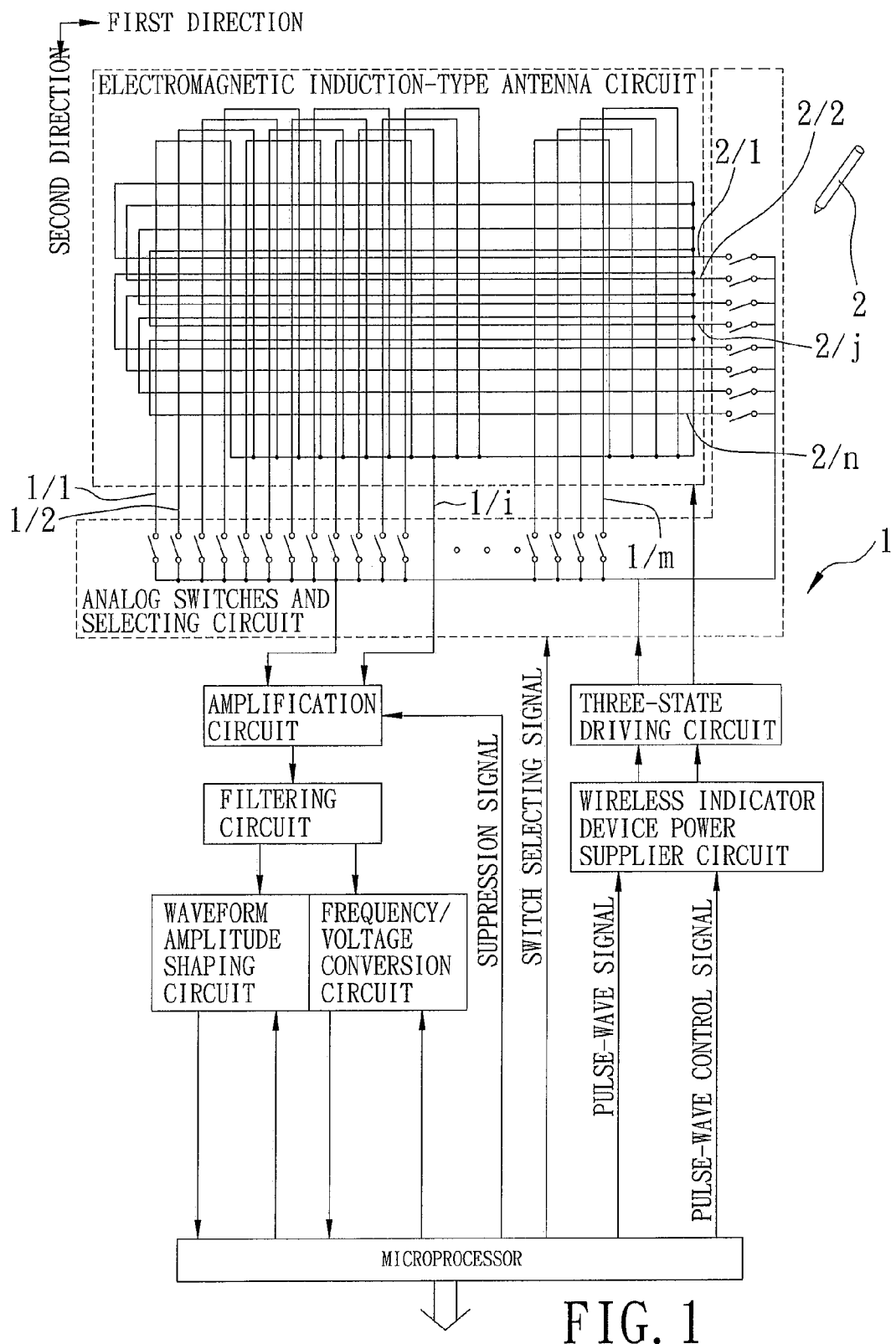
FIG. 1 is a circuit block diagram to illustrate a digital tablet of a conventional passive-type digital tablet pointing system.
Figure 2:
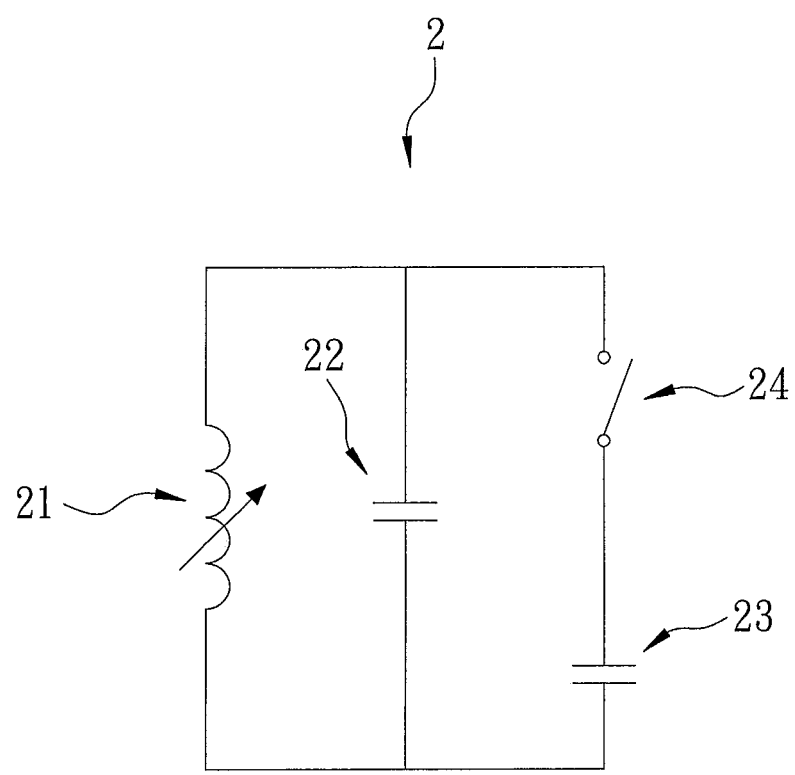
FIG. 2 is a circuit diagram to illustrate a wireless pointing device of the conventional passive-type digital tablet pointing system.
Figure 3:
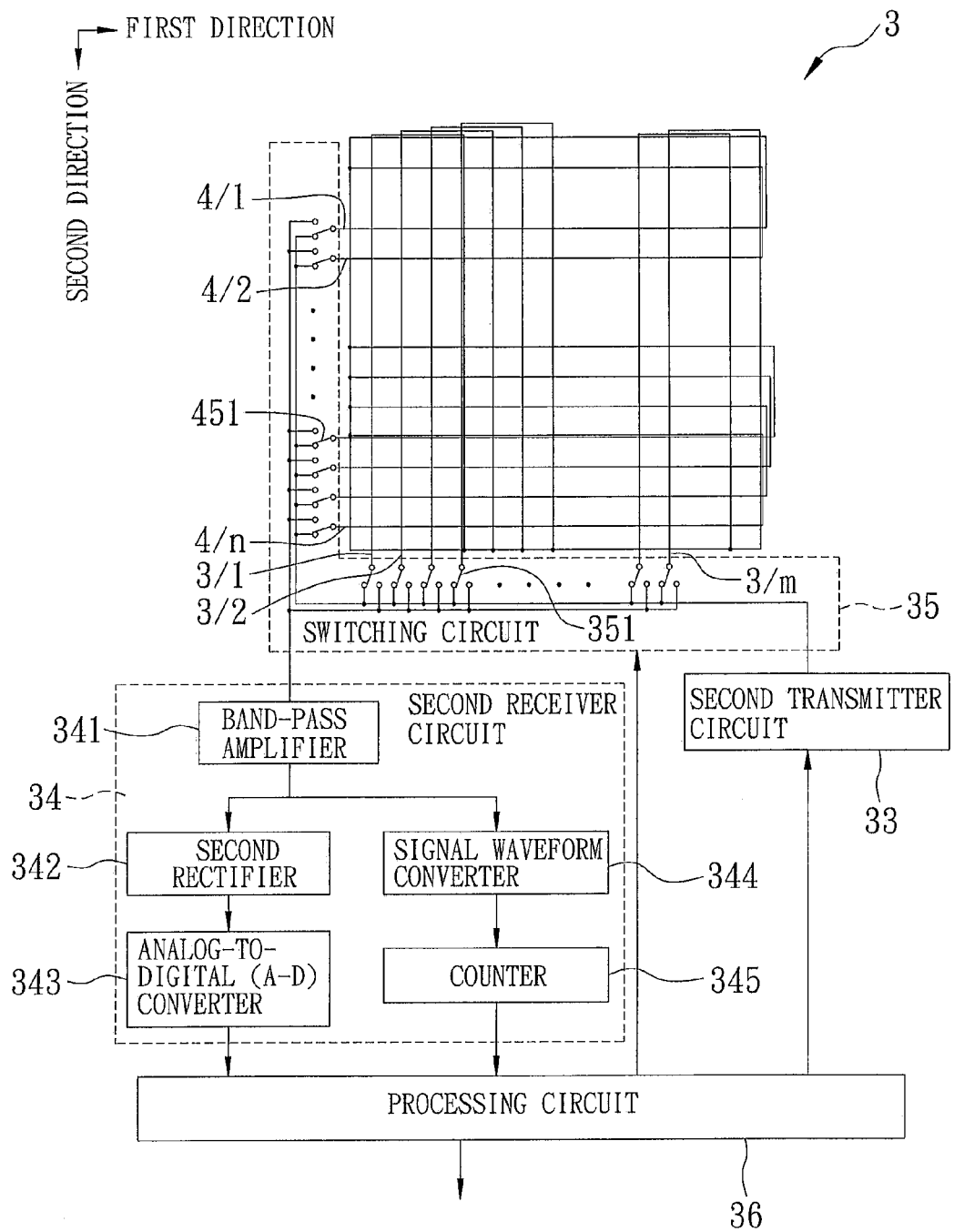
FIG. 3 is a circuit block diagram to illustrate a position detector of the preferred embodiment of a position detecting device of the present invention.
Figure 4:
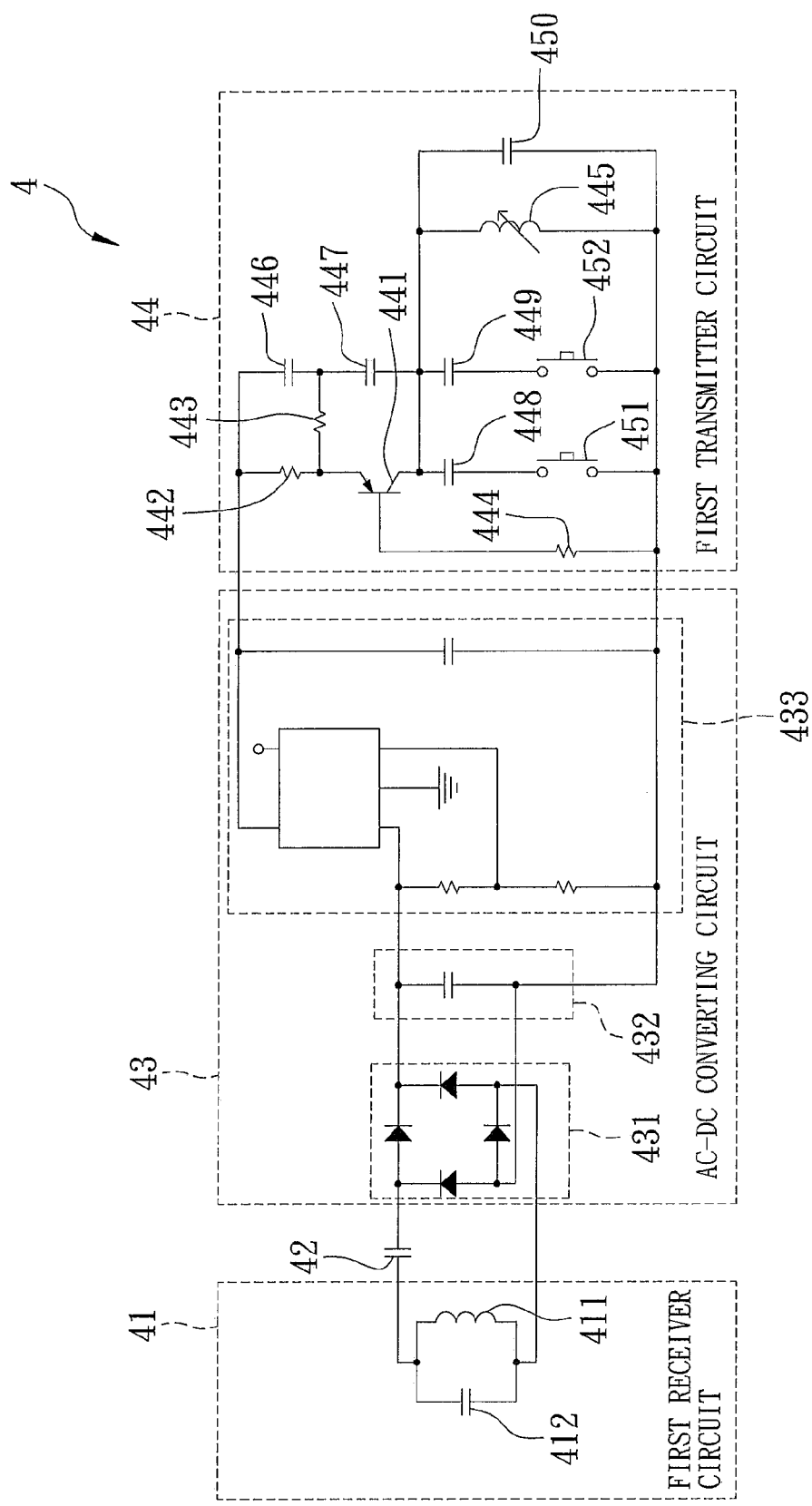
FIG. 4 is a circuit block diagram to illustrate a position indicator of the position detecting device.

Referring to FIGS. 3 and 4, the preferred embodiment of a position detecting device according to the present invention includes a position detector 3 (e.g., a digital tablet) and a position indicator 4 (e.g., a digital stylus). The position indicator 4 includes a first receiver circuit 41, a coupling capacitor 42, an AC-DC converting circuit 43, and a first transmitter circuit 44.

The first receiver circuit 41 is operable to resonate at a first frequency so as to generate a resonance signal upon receipt of an excitation signal. In this embodiment, the first receiver circuit 41 includes an inductor 411 and a capacitor 412 connected in parallel. The first frequency is determined by an inductance value of the inductor 411 and a capacitance value of the capacitor 412.

The AC-DC converting circuit 43 is connected electrically to the first receiver circuit 41 via the coupling capacitor 42 for receiving the resonance signal therefrom, and is operable to perform AC-DC conversion upon the resonance signal so as to generate a DC power signal. In this embodiment, the AC-DC converting circuit 43 includes a first rectifier 431, a filter 432, and a voltage regulator 433. The first rectifier 431 is a full-wave rectifier connected electrically to the first receiver circuit 41 via the coupling capacitor 42 for receiving the resonance signal therefrom, and operable to rectify the resonance signal so as to generate a rectified power signal. The filter 432 is a capacitor connected electrically to the first rectifier 431 for receiving the rectified power signal therefrom, and operable to filter the rectified power signal so as to generate a filtered power signal. The voltage regulator 433 is connected electrically to the filter 432 for receiving the filtered power signal therefrom, and is operable to regulate the filtered power signal so as to generate the DC power signal having a voltage corresponding to a predetermined voltage value. It is to be noted that configuration of the AC-DC converting circuit 43 is not limited to the disclosure of this embodiment.

The first transmitter circuit 44 is connected electrically to the voltage regulator 433 of the AC-DC converting circuit 43 for receiving the DC power signal therefrom, is powered by the DC power signal to oscillate at a second frequency different from the first frequency so as to generate an oscillation signal, and is operable to transmit the oscillation signal thus generated to the position detector 3. In this embodiment, the first transmitter circuit 44 is a Colpitts oscillator including: a transistor 441; first, second, and third resistors 442-444; a variable inductor 445; first, second, third, fourth, and fifth capacitors 446-450; and first and second switches 451, 452. The variable inductor 445 has an inductance that is in a negative relation to a contact pressure between the position indicator 4 and the position detector 3. Furthermore, the second frequency is in a negative relation to the inductance of the variable inductor 445. When the first switch 451 is in a conductive state, the third capacitor 448 will cause the second frequency to decrease. When the second switch 452 is in a conductive state, the fourth capacitor 449 will cause the second frequency to decrease. Preferably, one of the first and second frequencies is not lower than twice the other of the first and second frequencies.

It is worth noting that, when the position indicator 4 has a relatively small distributed capacitance, the coupling capacitor 42 may be omitted, and the first rectifier 431 of the AC-DC converting circuit 43 may be connected electrically and directly to the first receiver circuit 41.

The position detector 3 includes a plurality of first antennas 3/1-3/m arranged along a first direction, a plurality of second antennas 4/1-4/n arranged along a second direction, a second transmitter circuit 33, a second receiver circuit 34, a switching circuit 35, and a processing circuit 36. In this embodiment, the first and second directions are mutually perpendicular.

The second transmitter circuit 33 is operable to generate the excitation signal having the first frequency, and to transmit the excitation signal thus generated to the first receiver circuit 41. The second receiver circuit 34 is operable to receive the oscillation signal from the position indicator 4, and to perform band-pass filtering, amplitude detection, and frequency detection upon the oscillation signal so as to generate a processed signal. It is to be noted that a frequency range of the band-pass filtering includes the second frequency and excludes the first frequency.

The switching circuit 35 is connected electrically to the first antennas 3/1-3/m, the second antennas 4/1-4/n, the second transmitter circuit 33, and the second receiver circuit 34, and is operable according to a control signal having first and second states.

Under circumstances where the position detector 3 is unable to detect the position of the position indicator 4 (e.g., when the position detector 3 fails to receive the oscillation signals, or receives the oscillation signals having substantially identical amplitudes), the position detector 3 is configured to regularly perform a full-region scan so as to obtain the position of the position indicator 4. Once the position detector 3 obtains the position of the position indicator 4, the position detector 3 is configured to regularly perform a sub-region scan so as to track the position of the position indicator 4.

In the full-region scan: when the control signal is in the first state, the switching circuit 35 is configured to connect electrically the first antennas 3/1-3/m to the second transmitter circuit 33 for transmitting the excitation signal to the first receiver circuit 41, and to connect electrically the second antennas 4/1-4/n to the second receiver circuit 34 for enabling the second receiver circuit 34 to receive the oscillation signal from the first transmitter circuit 44; and when the control signal is in the second state, the switching circuit 35 is configured to connect electrically the first antennas 3/1-3/m to the second receiver circuit 34 for enabling the second receiver circuit 34 to receive the oscillation signal from the first transmitter circuit 44, and to connect electrically the second antennas 4/1-4/n to the second transmitter circuit 33 for transmitting the excitation signal to the first receiver circuit 41.

The difference between the full-region and sub-region scans resides in that, in the sub-region scan: when the control signal is in the first state, the switching circuit 35 is configured to connect electrically a portion of the second antennas 4/1-4/n to the second receiver circuit 34 for enabling the second receiver circuit 34 to receive the oscillation signal from the first transmitter circuit 44; and when the control signal is in the second state, the switching circuit 35 is configured to connect electrically a portion of the first antennas 3/1-3/m to the second receiver circuit 34 for enabling the second receiver circuit 34 to receive the oscillation signal from the first transmitter circuit 44. In this embodiment, the second receiver circuit 34 is connected to one antenna at a time during each of the full-region and sub-region scans.

In comparison with the full-region scan, the sub-region scan is less time-consuming and requires less processing. In this embodiment, the switching circuit is configured to connect electrically and simultaneously the second transmitter circuit 33 to the antennas during each of the full-region and sub-region scans.

In this embodiment, the switching circuit 35 includes a plurality of single pole, double throw (SPDT) switches 351 each having a common contact and first and second terminals. For each of the SPDT switches 351, the common contact is connected electrically to a corresponding one of the first antennas 3/1-3/m and the second antennas 4/1-4/n, the first terminal is connected electrically to the second transmitter circuit 33, and the second terminal is connected electrically to the second receiver circuit 34. Based on the control signal, each of the SPDT switches 351 is configured to establish an electrical connection between the common contact and one of the first and second terminals.

The processing circuit 36 is connected electrically to the second transmitter circuit 33, the second receiver circuit 34, and the switching circuit 35, is operable for generating the control signal such that the control signal alternates between the first and second states, and is operable for providing the control signal thus generated to the switching circuit 35. It is to be noted that the position detector 3 scans the vertical position of the position indicator 4 when the control signal is in one of the first and second states, and that the position detector 3 scans the horizontal position of the position indicator 4 when the control signal is in the other of the first and second states.

In this embodiment, when the control signal is in the first state, the second transmitter circuit 33 transmits the excitation signal simultaneously via each of the first antennas 3/1-3/m to the first receiver circuit 41, and the second receiver circuit 34 receives the oscillation signal sequentially via each of corresponding ones of the second antennas 4/1-4/n, and performs band-pass filtering, amplitude detection, and frequency detection upon the oscillation signals thus received so as to generate the processed signal containing a plurality of amplitude values and frequency information that correspond to the oscillation signals. The second receiver circuit 34 performs frequency detection upon the oscillation signals so as to determine whether the oscillation signals received thereby have the second frequency.

Furthermore, when the control signal is in the second state, the second transmitter circuit 33 transmits the excitation signal simultaneously via each of the second antennas 4/1-4/n to the first receiver circuit 41, and the second receiver circuit 34 receives the oscillation signal sequentially via each of corresponding ones of the first antennas 3/1-3/m, and performs pass-band filtering, amplitude detection, and frequency detection upon the oscillation signals thus received so as to generate the processed signal containing a plurality of amplitude values and frequency information that correspond to the oscillation signals.

Next, the processing circuit 36 is configured to obtain information corresponding to position of the position indicator 4 relative to the position detector 3 based on the amplitude values contained in the processed signal, and to obtain the operational information (e.g., the contact pressure between the position indicator 4 and the position detector 3, and whether the first and second switches 451, 452 are in the conductive state) corresponding to the position indicator 4 based on the frequency information contained in the processed signal.

In this embodiment, the processing circuit 36 is further configured to generate a square-pulse signal having the first frequency, and the second transmitter circuit 33 is further configured to convert the square-pulse signal into a sinusoidal-pulse signal, which serves as the excitation signal, and to perform impedance matching upon the antennas to which the second transmitter circuit 33 is electrically connected.

The second receiver circuit 34 of the preferred embodiment includes a band-pass amplifier 341, a second rectifier 342, an analog-to-digital (A-D) converter 343, a signal waveform converter 344, and a counter 345. The band-pass amplifier 341 is connected electrically to the switching circuit 35, and is operable to perform the band-pass filtering and amplification processes upon each of the oscillation signals received by the antennas, to which the second receiver circuit 34 is electrically connected via the switching circuit 35, so as to generate a corresponding amplified signal. The second rectifier 342 is connected electrically to the band-pass amplifier 341 for receiving the amplified signals therefrom, and is operable to rectify each of the amplified signals so as to generate a corresponding rectified signal. The A-D converter 343 is connected electrically to the second rectifier 342 for receiving the rectified signals therefrom, and is operable to perform A-D conversion upon each of the rectified signals so as to obtain a corresponding amplitude value corresponding to amplitude of the rectified signal. The processing circuit 36 is configured to obtain the information corresponding to the position of the position indicator 4 relative to the position detector 3 based on the amplitude values. The signal waveform converter 344 is connected electrically to the band-pass amplifier 341 for receiving the amplified signals therefrom, and is operable to convert the amplified signals, which have a sinusoidal waveform, into corresponding converted amplified signals having a square waveform. The counter 345 is connected electrically to the signal waveform converter 344 for receiving the converted amplified signals therefrom, and is operable for counting the number of rising edges within a predetermined duration so as to obtain the frequency information corresponding to the oscillation signal.

In summary, the position indicator 4 of the position detecting device is able to simultaneously transmit and receive signals to and from the position detector 3 such time required for position detection is relatively short. The position detector 3 only needs to scan once in each of the first and second directions in order to obtain the positional information corresponding to the position indicator 4, which is relatively less time-consuming. Furthermore, since the first and second frequencies are in non-overlapping frequency bands, when signals transmitted by the position detector 3 are received by the position detector 3, the position detector 3 may simply filter out the signals thus received. Moreover, through the use of the AC-DC converting circuit 43, the excitation signals received by the first receiver circuit 41 may be converted into the DC power signal having a substantially non-varying voltage for powering the first transmitter circuit 44, such that the oscillation signals transmitted by the first transmitter circuit 44 are substantially not subjected to influence of non-uniformity of the distributed capacitance and non-uniformity of the impedance matching of the first antennas 3/1-3/m, and to influence of non-uniformity of the distributed capacitance and non-uniformity of the impedance matching of the second antennas 4/1-4/n. Therefore, acquisition of the information corresponding to the position detector 3 is relatively simple.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A position detecting device comprising:
   a position indicator including
      a first receiver circuit operable to resonate at a first frequency so as to generate a resonance signal upon receipt of an excitation signal,
      an alternating-current-to-direct-current (AC-DC) converting circuit connected electrically to said first receiver circuit for receiving the resonance signal therefrom, and operable to perform AC-DC conversion upon the resonance signal so as to generate a direct current (DC) power signal, and
      a first transmitter circuit connected electrically to said AC-DC converting circuit for receiving the DC power signal therefrom, powered by the DC power signal to oscillate at a second frequency different from the first frequency so as to generate an oscillation signal, and operable to transmit the oscillation signal thus generated; and
   a position detector including
      a plurality of first antennas arranged along a first direction,
      a plurality of second antennas arranged along a second direction different from the first direction,
      a second transmitter circuit operable to generate the excitation signal,
      a second receiver circuit,
      a switching circuit connected electrically to said first and second antennas, said second transmitter circuit, and said second receiver circuit, and operable, according to a control signal, for switching between a first state, where said first antennas are connected electrically to said second transmitter circuit for transmitting the excitation signal to said first receiver circuit and where at least a portion of said second antennas is connected to said second receiver circuit for enabling said second receiver circuit to receive the oscillation signal from said first transmitter circuit, and a second state where said second antennas are connected electrically to said second transmitter circuit for transmitting the excitation signal to said first receiver circuit and where at least a portion of said first antennas is connected to said second receiver circuit for enabling said second receiver circuit to receive the oscillation signal from said first transmitter circuit,
      wherein said second receiver circuit is configured to perform band pass filtering and amplitude detection upon the oscillation signal to generate a processed signal, a frequency range of the band pass filtering including the second frequency and excluding the first frequency, and
      a processing circuit connected electrically to said switching circuit and said second receiver circuit, configured to provide the control signal to said switching circuit, and configured to obtain information corresponding to position of said position indicator relative to said position detector based on the processed signal from said second receiver circuit.

2. The position detecting device as claimed in claim 1, wherein said processing circuit is configured to generate the control signal such that the switching circuit alternates between the first and second states.

3. The position detecting device as claimed in claim 1, wherein said AC-DC converting circuit of said position indicator includes
   a first rectifier connected electrically to said first receiver circuit for receiving the resonance signal therefrom, and operable to rectify the resonance signal so as to generate a rectified power signal,
   a filter connected electrically to said first rectifier for receiving the rectified power signal therefrom, and operable to filter the rectified power signal so as to generate a filtered power signal, and
   a voltage regulator connected electrically to said filter for receiving the filtered power signal therefrom, and operable to regulate the filtered power signal so as to generate the DC power signal.

4. The position detecting device as claimed in claim 1, wherein said second receiver circuit of said position detector includes
   a band-pass amplifier connected electrically to said switching circuit, and operable to perform band-pass filtering and amplification upon the oscillation signal received by said band-pass amplifier via said switching circuit so as to generate an amplified signal,
   a second rectifier connected electrically to said band-pass amplifier for receiving the amplified signal therefrom, and operable to rectify the amplified signal so as to generate a rectified signal, and
   an analog-to-digital (A-D) converter connected electrically to said second rectifier for receiving the rectified signal therefrom, and operable to perform A-D conversion upon the rectified signal so as to obtain an amplitude value corresponding to an amplitude of the rectified signal, said processing circuit being configured to obtain the information corresponding to the position of said position indicator relative to said position detector based on the amplitude value.

5. The position detecting device as claimed in claim 1, wherein said switching circuit includes a plurality of single pole, double throw (SPDT) switches each having a common contact, and first and second terminals, said common contact of each of said SPDT switches being connected electrically to a corresponding one of said first and second antennas, said first terminal of each of said SPDT switches being connected electrically to said second transmitter circuit, said second terminal of each of said SPDT switches being connected electrically to said second receiver circuit.

6. The position detecting device as claimed in claim 1, wherein said processing circuit of said position detector is further configured to generate square-pulse signal having the first frequency, and said second transmitter circuit is connected electrically to said processing circuit and is further configured to convert the square-pulse signal into a sinusoidal-pulse signal which serves as the excitation signal.

7. The position detecting device as claimed in claim 1, wherein one of the first and second frequencies is not lower than twice the other of the first and second frequencies.

8. The position detecting device as claimed in claim 1, wherein the first and second directions are mutually perpendicular.

9. The position detecting device as claimed in claim 1, wherein said at least a portion of said second antennas is sequentially connected to said second receiver circuit when said switching circuit is in the first state, and said at least a portion of said first antennas is sequentially connected to said second receiver circuit when said switching circuit is in the second state.

* * * * *